United States Patent
Alam

(10) Patent No.: US 12,219,089 B2
(45) Date of Patent: Feb. 4, 2025

(54) DETERMINING MISSED CALL RATE IN OVER THE TOP (OTT) APPLICATIONS

(71) Applicant: T-MOBILE INNOVATIONS LLC, Overland Park, KS (US)

(72) Inventor: Shaheed Alam, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/095,947

(22) Filed: Jan. 11, 2023

(65) Prior Publication Data

US 2024/0236229 A1   Jul. 11, 2024

(51) Int. Cl.
*H04M 3/22* (2006.01)

(52) U.S. Cl.
CPC ................... *H04M 3/2218* (2013.01)

(58) Field of Classification Search
CPC ............... H04M 3/2218; H04M 1/656; H04M 2203/2088; H04M 2203/305; H04M 3/42042; H04M 3/42059; H04M 3/42102; H04M 3/42221; H04M 3/56; H04M 3/568; H04M 3/42195; H04M 3/5166
See application file for complete search history.

(56) References Cited

U.S. PATENT DOCUMENTS

| | | | |
|---|---|---|---|
| 2005/0181731 A1* | 8/2005 | Asghar | H04W 52/0216 455/24 |
| 2006/0020459 A1* | 1/2006 | Carter | G10L 17/00 704/E17.003 |
| 2010/0190474 A1* | 7/2010 | Rajguru | H04W 12/08 707/610 |
| 2012/0094642 A1* | 4/2012 | Popperl | H04L 67/02 455/415 |

\* cited by examiner

*Primary Examiner* — Akelaw Teshale
(74) *Attorney, Agent, or Firm* — Shook, Hardy & Bacon L.L.P.

(57) ABSTRACT

Methods and systems for determining a missed call rate in an OTT application are provided. The method begins with receiving, at a telephony application server (TAS), a call invitation. The TAS then forwards the call invitation to a web real-time communications (WebRTC) node which sends the call to an OTT application. The TAS activates a response timer after forwarding the call invitation. Next, it is determined if a response to the call invitation is received before the expiration of the response timer. A response code and a reason header are logged in a call data record whether the response to the call invitation is an acceptance or a decline. If a response is not received by the TAS within a predetermined period of time, the TAS labels the call as "not reachable." The information in the call data record allows determining a missed call rate for an OTT application.

20 Claims, 5 Drawing Sheets

DETERMINING MISSED CALL RATE IN OVER THE TOP (OTT) APPLICATIONS

BACKGROUND

Wireless network providers track key performance indicators (KPIs) of many network parameters. Network performance parameters are also important in ensuring customer success. Most cellular operators track metrics such as dropped calls, mobility, integrity, availability, accessibility, retainability, and utilization. As more users use over-the-top (OTT) applications for internet-based calls KPIs are needed for these applications. However, determining KPIs for OTT applications is less straightforward than determining KPIs for a cellular network, as the application may be operating in the foreground or background and the attempted call may be routed through a convoluted and forking path before concluding, all of which make determining a missed call rate in an OTT application difficult.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for determining a missed call rate in an OTT application are provided. The method begins with receiving, at a telephony application server (TAS), a call invitation. The TAS then forwards the call invitation to a web real-time communications (WebRTC) node, which eventually sends the call to an OTT application. The TAS then activates a response timer after forwarding the call invitation. The method continues with determining if a response to the call invitation is received before the expiration of the response timer. A response code and a reason header is then logged in a call data record regardless of whether the response to the call invitation is an acceptance or a decline. If a response is not received by the TAS within a predetermined period of time, the TAS labels the call as "not reachable." This information in the call data record allows determining a missed call rate for an OTT application.

In a further embodiment, a system for determining a missed call rate in an OTT application is provided. The method begins with transmitting, to a TAS, a call invitation. The method then continues with receiving at least one of the following in a call data record: a call invitation accepted, no response to the call invitation, or call invitation declined due to a do not disturb setting. If the call invitation is declined or a response timer expires a reason code is returned. Then, based on the call data record a missed call rate is determined.

An additional embodiment provides a non-transitory computer storage media storing computer-useable instructions that, when executed by one or more processors cause the processors to receive, at a TAS, a call invitation. The instructions then forward, by the TAS, the call invitation to a web real-time communications (WebRTC) node. The WebRTC node then sends the call invitation to the OTT application. Then the instructions direct the processors to activate, by the TAS, a response timer after forwarding the call invitation. Next, the processors determine if a response to the call invitation is received before expiration of the response timer. Then the instructions provide for log a response code and a reason header in a call data record regardless of whether the response to the call invitation is an acceptance or a decline. A missed call rate based on the call data record can then be determined.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
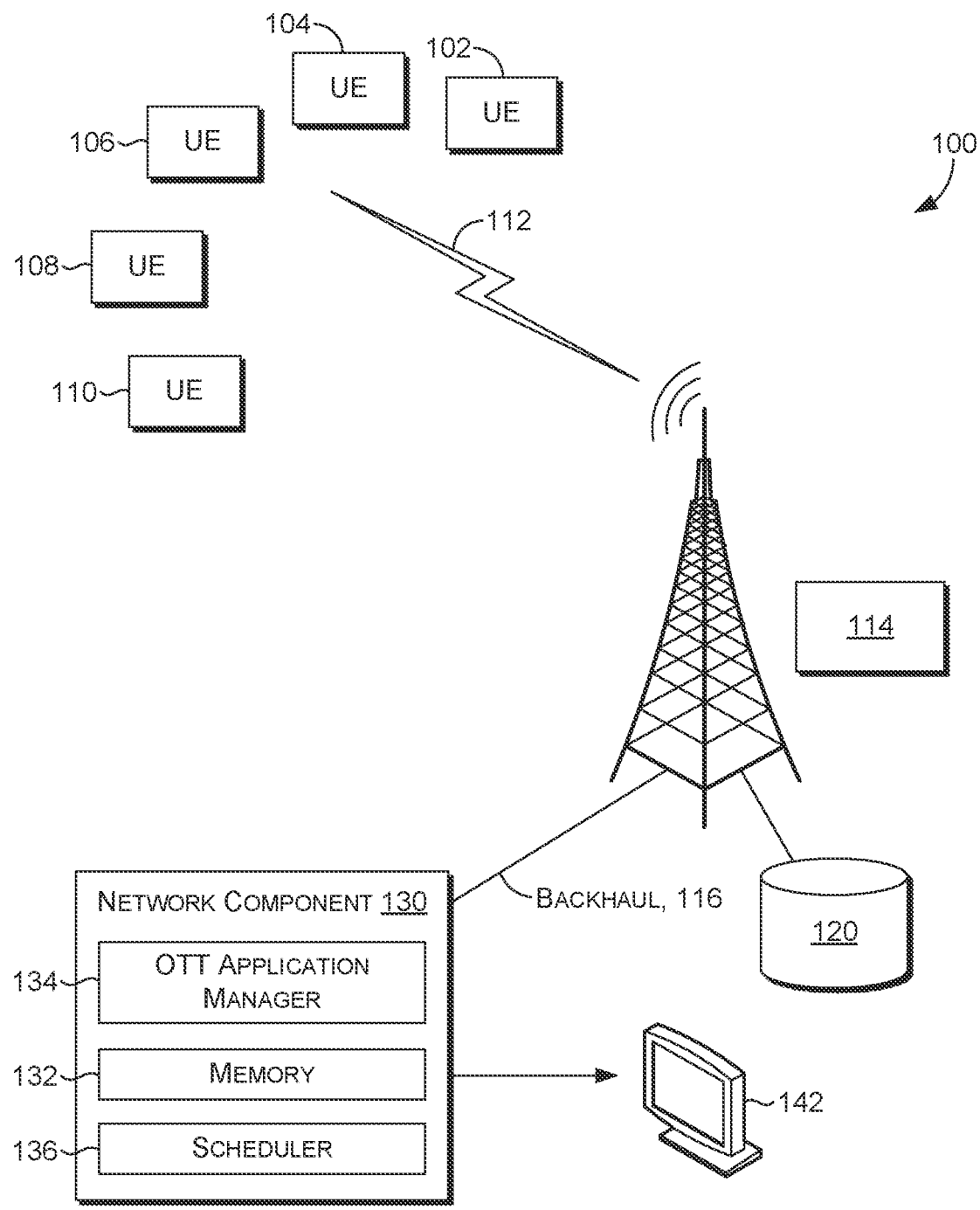
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
CSCF Call Session Control Function
eNodeB Evolved Node B
GIS Geographic/Geographical/Geospatial Information System
gNodeB Next Generation Node B
GPRS General Packet Radio Service GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
ML Machine Learning
OTT Over-the-Top
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TAS Telephony Application Server
TDMA Time Division Multiple Access
TXRU Transceiver (or Transceiver Unit)
UE User Equipment
UMTS Universal Mobile Telecommunications Systems
WCD Wireless Communication Device (same as UE)
WebRTC Web Real-Time Communications Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station.

Figure 5:
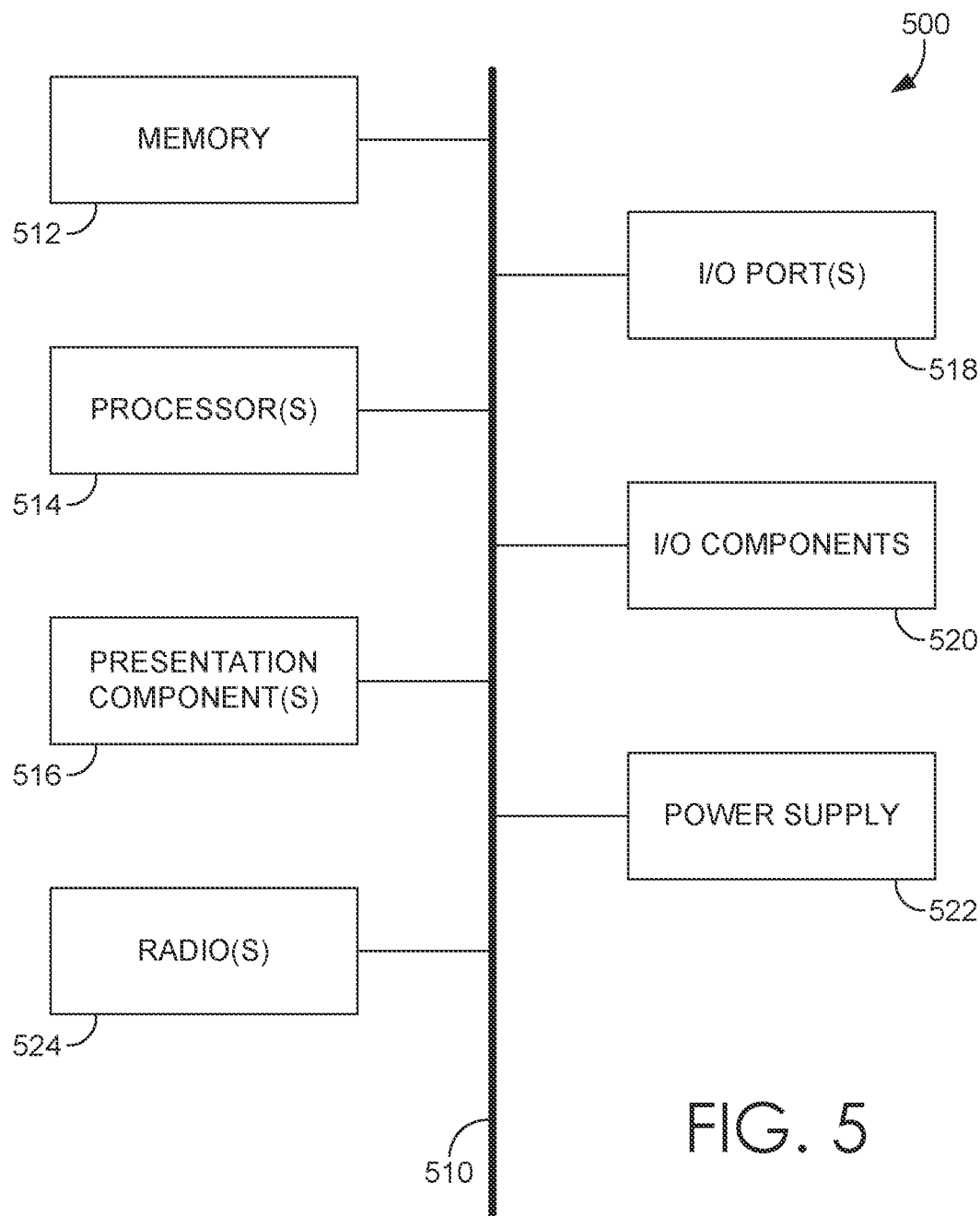
FIG. 5 depicts an exemplary computing device suitable for use in implementations of the present disclosure, in accordance with aspects herein.

A UE may be, in an embodiment, similar to device 500 described herein with respect to FIG. 5.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method of determining a missed call rate in an OTT application is provided. The method begins with receiving, at a telephony application server (TAS), a call invitation. The TAS then forwards the call invitation to a web real-time communications (WebRTC) node, which eventually sends the call to an OTT application. The TAS then activates a response timer after forwarding the call invitation. The method continues with determining if a response to the call invitation is received before the expiration of the response timer. A response code and a reason header is then logged in a call data record regardless of whether the response to the call invitation is an acceptance or a decline. If a response is not received by the TAS within a predetermined period of time, the TAS labels the call as "not reachable." This information in the call data record allows determining a missed call rate for an OTT application.

A second aspect of the present disclosure provides a method of determining a missed call rate in an OTT application is provided. The method begins with transmitting, to a TAS, a call invitation. The method then continues with receiving at least one of in a call data record: a call invitation accepted, no response to the call invitation, or call invitation declined due to a do not disturb setting. If the call invitation is declined or a response timer expires a reason code is returned. A missed call rate may then be determined based on the call data record.

Another aspect of the present disclosure is directed to a non-transitory computer storage media storing computer-useable instructions that, when used by one or more processors, cause the processors to receive, at a TAS, a call invitation. The instructions then forward, by the TAS, the call invitation to a web real-time communications (WebRTC) node. The WebRTC node then sends the call invitation to an OTT application. Then the instructions direct the processors to activate, by the TAS, a response timer after forwarding the call invitation. Next, the processors determine if a response to the call invitation is received before expiration of the response timer. Then the instructions provide for log a response code and a reason header in a call data record regardless of whether the response to the call invitation is an acceptance or a decline. A missed ball rate may then be determined based on the call data record.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes UE devices 102, 104, 106, 108, and 110, base station 114 (which may be a cell site or the like), and one or more communication channels 112. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, an extended reality device, and any combination of these delineated devices, or any other device (such as the computing device (500) that communicates via wireless communications with the base station 114 in order to interact with a public or private network.

In some aspects, each of the UEs 102, 104, 106, 108, and 110 may correspond to computing device 500 in FIG. 5. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects subscribers to their immediate telecommunications service provider (i.e., home network carrier). In some instances, the one or more communication channels 112 can be associated with a telecommunications provider that provides services (e.g., 3G network, 4G network, LTE network, 5G network, 6G network, and the like) to user devices, such as UEs 102, 104, 106, 108, and 110. For example, the one or more communication channels may provide voice, SMS, and/or data services to UEs 102, 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132, an OTT application manager 134, and a scheduler 136. All determinations, calculations, and data further generated by the OTT application manager 134, and scheduler 136 may be stored at the memory 132 and also at the data store 140. The OTT application manager 134 interfaces with the network and with a WebRTC node as well as a call log and notes if the OTT application is operating in the background or foreground. Although the network component 130 is shown as a single component comprising the memory 132, OTT application manager 134, and the scheduler 136, it is also contemplated that each of the memory 132, OTT application manager 134, and scheduler 136 may reside at different locations, be its own separate entity, and the like, within the home network carrier system.

The network component 130 is configured to retrieve signal information, UE device information, slot configuration, latency information, including quality of service (QoS) information, and metrics from the base station 114 or one of the UE devices 102, 104, 106, 108, and 110. The information may also include radio frequency (RF) signal quality information, such as signal to interference and noise ratio (SINR). UE device information can include a device identifier and data usage information. The OTT application manager 134 can monitor the OTT call activity and processing information from UEs 102, 104, 106, 108, and 110. The OTT application manager determines the performance metrics of OTT applications used by the UEs 102, 104, 106, 108, and 110. The performance metrics may include call logs which may include response codes and reason headers for calls processed through OTT applications.

Figure 2:
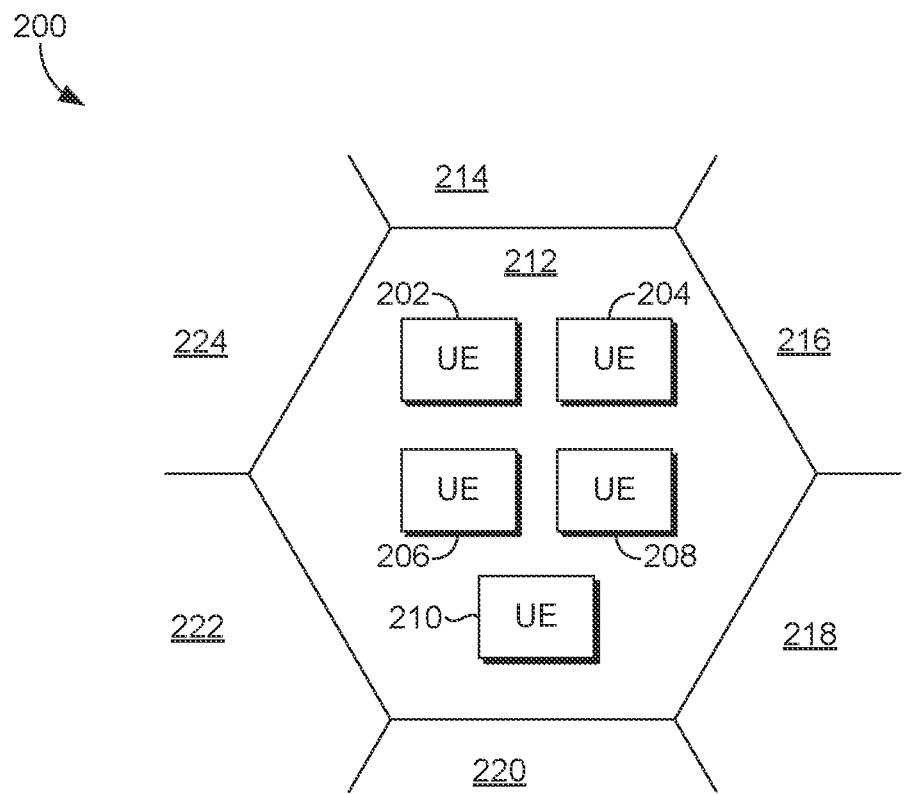
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including a base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and 210, may be located within geographic area 200 collecting UE data that is useable by network component 130, in accordance with aspects herein. UEs 202, 204, 206, 208, and 210 can move within the cell currently occupying, such as cell 212 and can move to other cells such as adjoining cells 214, 216, 218, 220, 222 and 224.

VoIP and voice over new radio (VoNR) allow use of spectrum for circuit switched voice calls. Both VoIP and VoNR packetize voice calls over IP and transport both signaling and media components over a 4G LTE packet switched data path. The 5G user plane may also be used for signaling and transport. This may expand coverage with voice over WiFi and may also offer improved call quality with high definition audio.

VoIP and VoNR operate in contrast to circuit switched methodologies which may require 4G handsets to use a secondary 3G radio. This can be problematic, as 3G technologies are being phased out and 5G technology is increasing. When the voice signal is packetized, voice packets are sent over the network, which may be a 5G or NR network or a 4G LTE network. Voice calls made using VoNR may take advantage of the lower latency of the 5G network and may also provide high speed data at the same time.

Figure 3:
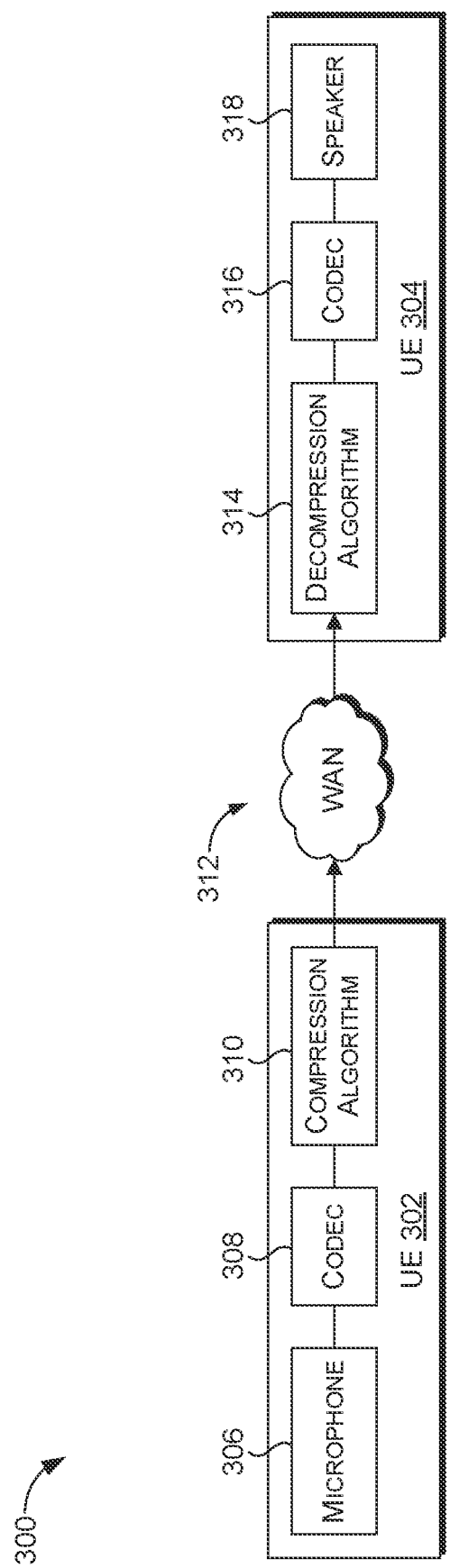
FIG. 3 depicts a flow of a compressed voice circuit, in which implementations of the present disclosure may be employed, in accordance with aspects herein.

FIG. 3 depicts a flow of a compressed voice circuit, in which implementations of the present disclosure may be employed, in accordance with aspects herein. The system 300 includes a first UE 302 and a second UE 304. The first UE 302 is sending a VoIP message to the second UE 304. The VoIP message can be sent over a wide area network (WAN) 312. If the voice message was sent using NR a base station, such as an eNB, would be used in place of WAN 312. The user of the first UE 302 speaks into microphone 306 which transmits an analog signal to a voice coder-decoder (CODEC) 308. The CODEC 308 digitizes the analog signal to create pulse code modulated (PCM) samples. The PCM samples from CODEC 308 are input to compression algorithm 310. The compression algorithm compresses the PCM samples into a packet format for transmission across the WAN 312. The WAN 312 delivers the packets to the second UE 304. Upon receipt of the packets, a decompression algorithm 314 decompresses the packets and passes them to CODEC 316 which decodes the packets into an analog signal and passes the analog signal to a speaker 318 for output.

When users make calls using OTT applications the call is handled by a TAS. The TAS forwards a call invitation to a WebRTC node. The WebRTC node then sends the call invitation to the OTT application. When the call concludes the TAS server receives an indication to terminate the OTT call. The TAS then forwards the call to the WebRTC node where the OTT is registered.

The WebRTC node uses an application programming interface (API), JavaScript, and hypertext markup language (HTML) to embed communications technologies within web browsers. The APIs are used to create peer-to-peer (P2P) communications between internet web browsers and mobile applications without compatibility issues. WebRTC APIs perform key functions, including accessing data, as well as accessing and recording video, audio, and text-based data from devices to initiating, monitoring, and ending P2P connections between devices via browsers. In addition, WebRTC APIs facilitate bi-directional data transfer over multiple data channels.

Determining call metrics for WebRTC applications using a cellular network as the data network has been difficult. When the TAS receives a call for a terminating OTT call, the TAS forwards the call to the WebRTC node where the OTT call is registered. The OTT application may operate in background mode or foreground mode, which may affect how the OTT call is forwarded to the OTT application.

When the TAS forwards a call invite, the TAS waits for a response from the OTT application through the WebRTC node and CSCF. The TAS wait time is predetermined and defined in the TAS operation software. The time period may be known as the response timer. If the TAS receives a response the timer may be reset and the response period begins again.

If the OTT application is operating in background mode, the invite is sent to the OTT using a push (PNS) notification. The OTT application may interface with the OTT application manager 134 of FIG. 1 to receive and manage call log data. While this may work most of the time, in some cases the PNS notification may be inadvertently deleted. In other use cases a user may have "do not disturb" (DND) enabled on the application. When the DND notification is enabled the WebRTC responds to the TAS before the expiration of the response timer and provides the appropriate response code and reason header. The necessary reason code, which may be known as (480) and reason header (Not Reachable) is recorded in the transaction log or call data record (CDR).

If the TAS does not receive a response before the response timer expires, the TAS sends a cancel message to the WebRTC node through the CSCF. The cancel message has the reason header "not reachable." Tracking call metrics for OTT calls may be complicated if multiple devices are used for the same number or a native number that is also linked to the OTT, the TAS will fork the call towards all devices. This situation may arise when a user has a mobile phone, tablet, and a computer that share applications between the devices. When one device accepts the call, a cancel message is sent to the other devices. The cancel message may provide the reason "call completed elsewhere." Each of the codes may be tabulated to determine how many times the OTT missed the terminating call. The computation may be performed by taking the sum of not reachable calls divided by a number of total call attempts. Any cancel messages are not included in the total call attempts, as those calls were completed elsewhere.

Figure 4:
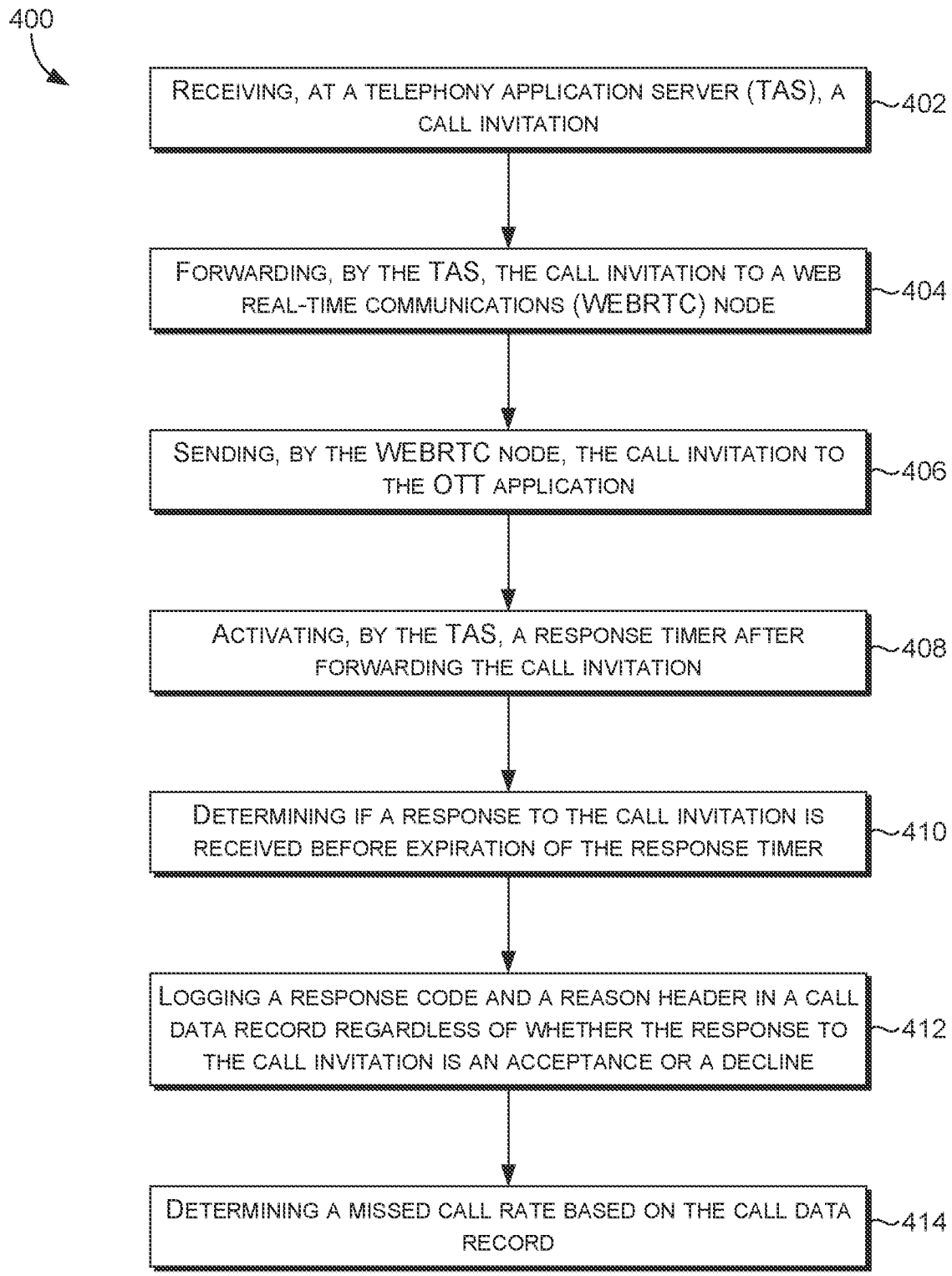
FIG. 4 is a flow diagram of an exemplary method of determining missed call rate in an OTT application in an exemplary network environment, in which aspects of the present disclosure may be employed, in accordance with aspects herein.

FIG. 4 is a flow diagram of an exemplary method of determining missed call rate in an OTT application in an exemplary network environment, in which aspects of the present disclosure may be employed, in accordance with aspects herein. The method 400 begins in step 402 with receiving, at a TAS, a call invitation. Next, in step 404 the method continues with forwarding, by the TAS, the call invitation to a WebRTC node. The method then continues in step 406 with sending, by the WebRTC node, the call invitation to the OTT application. Next, in step 408 the method proceeds with activating, by the TAS, a response timer after forwarding the call invitation. After the response timer has been activated, then in step 410 the method continues with determining if a response to the call invitation is received before expiration of the response timer. The method continues in step 412 with logging a response code and a reason header in a call data record regardless of whether the response to the call invitation is an acceptance or a decline. At step 414 a missed call rate is determined based on the call data record.

During the method the user may accept the call invitation which causes the response timer to stop and reset. An indication that the call invitation was accepted is logged in a call log. The response timer may be set in advance with a predetermined period of time to allow users to accept or decline call invitations. If the response timer expires the TAS sends a cancel message to the WebRTC node. The cancel message may be sent to the WebRTC node through a CSCF and may also include a not reachable reason header. Users of OTT services may also enable do not disturb functions. When a do not disturb function is activated, the response code and reason header may include information about the do not disturb function. This information may be included before the response timer expires and may be included in the call log.

FIG. 5 depicts an exemplary computing device suitable for use in implementations of the present disclosure, in accordance with aspects herein. With continued reference to FIG. 5, computing device 500 includes bus 502 that directly or indirectly couples the following devices: memory 504, one or more processors 506, one or more presentation components 508, input/output (I/O) ports 512, I/O components 510, radio 516, transmitter 518, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 510. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 510. One or more presentation components 508 present data indications to a person or other device. Exemplary one or more presentation components 508 include a display device, speaker, printing component, vibrating component, etc. I/O ports 512 allow computing device 500 to be logically coupled to other devices including I/O components 510, some of which may be built into computing device 500. Illustrative I/O components 510 include a microphone, joystick, game pad, satellite dish, scanner, printer, wireless device, etc.

The radio 516 represents one or more radios that facilitate communication with a wireless telecommunications network. While a single radio 516 is shown in FIG. 5, it is contemplated that there may be more than one radio 516 coupled to the bus 502. In aspects, the radio 516 utilizes a transmitter 518 to communicate with the wireless telecommunications network. It is expressly conceived that a computing device with more than one radio 516 could facilitate communication with the wireless telecommunications network via both the first transmitter 518 and an additional transmitters (e.g. a second transmitter). Illustrative wireless telecommunications technologies include CDMA, GPRS, TDMA, GSM, and the like. The radio 516 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of determining a missed call rate in an over-the-top (OTT) application in a network, the method comprising:
   receiving, at a telephony application server (TAS), a call invitation;
   communicating the call invitation to the OTT application;
   activating a response timer subsequent to communicating the call invitation;
   determining if a response to the call invitation by the OTT application was received before expiration of the response timer;
   logging a response code and a reason header in a call data record, wherein the response code and the reason header indicate whether the response to the call invitation by the OTT application is an acceptance or a decline; and
   determining a missed call rate for the OTT application based on the call data record.

2. The method of claim 1, wherein if the response to the call invitation is received before the expiration of the response timer, the response timer is reset.

3. The method of claim 2, wherein if the response timer is reset an indication that the call invitation was accepted is logged.

4. The method of claim 1, wherein the response timer is set for a predetermined period of time.

5. The method of claim 1, wherein if the response timer expires, the TAS communicates a cancel message.

6. The method of claim 5, wherein the cancel message is communicated through a call session control function (CSCF).

7. The method of claim 6, wherein the cancel message is communicated after the TAS labels the call as "not reachable".

8. The method of claim 1, wherein the call invitation is communicated to the OTT using a push notification if the OTT application is operating in a background mode.

9. The method of claim 1, further comprising determining if a do not disturb function is enabled on the OTT application.

10. The method of claim 9, wherein a response code and a reason header are provided before expiration of the response timer when it is determined that the do not disturb function is enabled.

11. The method of claim 1, further comprising summing a quantity of not reachable calls and dividing the quantity of not reachable calls by a quantity of total call attempts.

12. The method of claim 11, wherein the quantity of total call attempts does not include calls canceled due to completion on another device.

13. A method of determining a missed call rate in an over-the-top (OTT) application in a network, the method comprising:
   transmitting, to a telephony application server (TAS), a call invitation;
   receiving at least one of: a call invitation accepted, no response to the call invitation, or call invitation declined due to a do not disturb setting in a call data record of the OTT application, wherein an expiration of a response timer or a return of a reason code are provided if the call invitation is declined; and
   determining a missed call rate for the OTT application based on the call data record.

14. The method of claim 13, wherein the call invitation is received via a push notification to the OTT application if the OTT application is operating in a background mode.

15. A non-transitory computer storage media storing computer-useable instructions that, when used by one or more processors, cause the processors to:
   receive, at a telephony application server (TAS), a call invitation;
   communicate the call invitation to an over-the-top (OTT) application;
   activate, by the TAS, a response timer after communicating the call invitation;
   determine if a response to the call invitation by the OTT application is received before expiration of the response timer;
   log a response code and a reason header in a call data record, wherein the response code and the reason header indicate whether the response to the call invitation is an acceptance or a decline by the OTT application; and
   determine a missed call rate for the OTT application based on the call data record.

16. The non-transitory computer storage media of claim 15, wherein the response timer is set for a predetermined period of time.

17. The non-transitory computer storage media of claim 15, wherein the call invitation is communicated to the OTT using a push notification if the OTT application is operating in a background mode.

18. The non-transitory computer storage media of claim 15, further comprising summing a quantity of not reachable calls and dividing the quantity of not reachable calls by a quantity of total call attempts.

19. The non-transitory computer storage media of claim 18, wherein the quantity of total call attempts does not include calls cancelled due to completion on another device.

20. The non-transitory computer storage media of claim 15, further comprising determine if a do not disturb function is enabled on the OTT application and respond with a response code and a reason header before expiration of the response timer if the do not disturb function is enabled.

* * * * *